United States Patent [19]

Alling et al.

[11] Patent Number: 5,122,001

[45] Date of Patent: Jun. 16, 1992

[54] SPLIT RING ANTIFRICTION BEARING RETAINER

[75] Inventors: Richard L. Alling; Richard W. Shepard, both of Torrington, Conn.

[73] Assignee: The Torrington Company, Torrington, Conn.

[21] Appl. No.: 705,666

[22] Filed: May 24, 1991

[51] Int. Cl.⁵ .................... F16C 33/38; F16C 33/42
[52] U.S. Cl. ................... 384/530; 384/523; 384/528
[58] Field of Search .............. 384/523–534, 384/572, 575, 577, 614, 623; 29/898.067

[56] References Cited

U.S. PATENT DOCUMENTS

| | | |
|---|---|---|
| 2,706,137 | 4/1955 | Stricklen . |
| 3,239,282 | 3/1966 | Schroll et al. ............... 384/529 |
| 3,443,847 | 5/1969 | Dickinson . |
| 3,820,867 | 6/1974 | Dickinson et al. . |

FOREIGN PATENT DOCUMENTS

| | | | |
|---|---|---|---|
| 573561 | 6/1924 | France | 384/528 |
| 573562 | 6/1924 | France | 384/528 |
| 573779 | 6/1924 | France | 384/528 |
| 696285 | 12/1930 | France | 384/533 |
| 349454 | 11/1960 | Switzerland | 384/523 |

Primary Examiner—Thomas R. Hannon
Attorney, Agent, or Firm—Michael H. Minns; John C. Bigler

[57] ABSTRACT

A split ring antifriction bearing retainer assembled from two mating annular split rings. Each split ring has a plurality of ball pockets. When the two split rings are assembled, the ball pockets of one split ring are aligned with the ball pockets of the other split ring. The ends of one split ring are angularly offset from the ends of the other split ring.

7 Claims, 2 Drawing Sheets

SPLIT RING ANTIFRICTION BEARING RETAINER

BACKGROUND OF THE INVENTION

This invention relates generally to retainers for antifriction bearings and more particularly to ball bearing retainers formed from two halves.

One type of prior art ball bearing retainer is formed from two annular rings. Multiple ball pockets are pressed into each annular ring. The two annular rings are assembled with the balls into a bearing between the bearing races. The two annular rings are then fastened together. Typically, the rings are sheared from a wide flat strip of material. Shearing the retainer from a wide flat strip results in excessive waste material.

Another method forms the retainer from a narrow strip of material. The strip is curved into an annular ring and the ends are welded together. The ball pockets are pressed into each annular ring. Two annular rings are then fastened together. When fastening the two annular rings together, the weld area where the ends are welded together is a non-uniformity in the annular ring. This non-uniformity can cause problems when fastening the two annular rings together. In extreme cases, the non-uniformity of the weld area can cause premature retainer failure.

The foregoing illustrates limitations known to exist in present two-part antifriction bearing retainers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a split ring antifriction bearing retainer assembled from two mating annular split rings. Each split ring has a plurality of ball pockets. When the two split rings are assembled, the ball pockets of one split ring are aligned with the ball pockets of the other split ring. The ends of one split ring are angularly offset from the ends of the other split ring.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
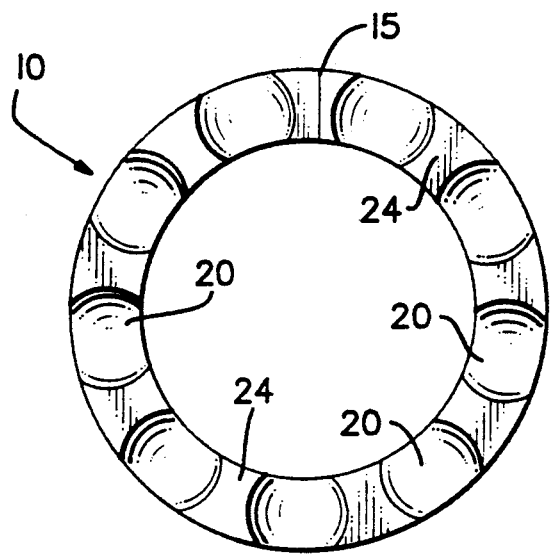
FIG. 1 is a plan view illustrating an annular split ring element of an embodiment of the split ring antifriction bearing retainer.

FIG. 1 shows an annular split ring 10 which forms one half of the split ring antifriction bearing retainer of the present invention. The annular split ring 10 has a plurality of ball pockets 20 and two free ends 15 at the split. Bridge areas 24 are located between adjacent ball pockets 20. The annular split ring 10 can be formed using any of the known prior art methods. The annular split ring 10 can also be formed from a narrow flat strip of material which is curled into the ring shape.

Prior to forming the ball pockets 20, the ends 15 of the annular split ring 10 can overlap as described in co-pending application Ser. No. 717,486, filed Jun. 19, 1991. Next, multiple ball pockets 20 are pressed into the annular split ring 10. Spherical ball seats are pressed into the ball pockets 20.

Figure 2:
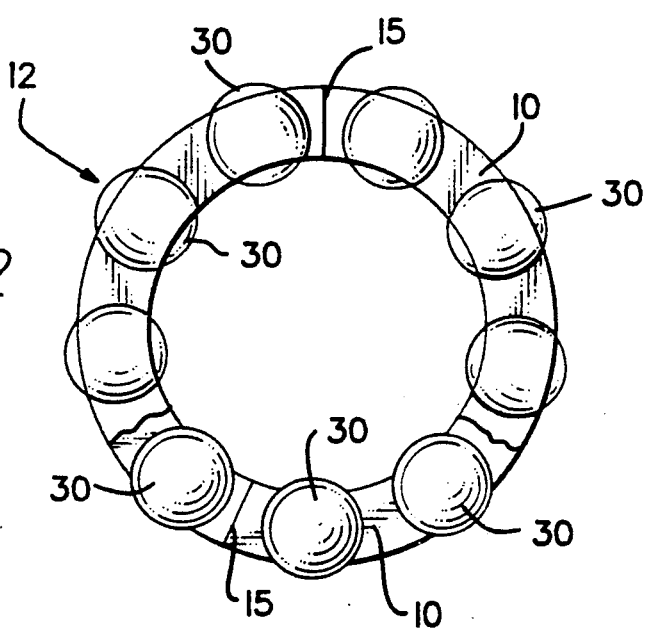
FIG. 2 is a plan view of the split ring antifriction bearing retainer with a partial breakout of one split ring.

Two annular split rings 10 along with bearing balls 30 are then assembled into an antifriction bearing. FIG. 2 shows a plan view of an assembled split ring antifriction bearing retainer 12 of the present invention. For clarity, the retainer 12 is shown without the bearing inner and outer races. After the annular split rings 10 and balls 30 are assembled into the bearing, the annular split rings 10 are pressed together while the bridges 24 are fastened together by welding or any other known fastening technique.

Figure 3:
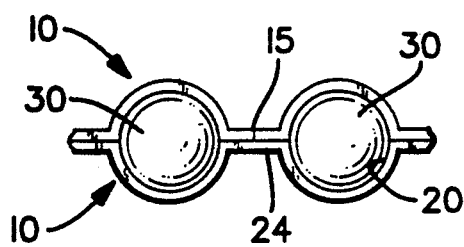
FIG. 3 is a side view of a portion of an assembled split ring antifriction bearing retainer.

The two annular split rings 10 are assembled with the ends 15 offset from one another. FIG. 3 shows a side view of the portion of retainer 12 which includes the ends 15 from one of the annular split rings 10. FIG. 2 shows the ends 15 offset by 160°.

The preferred offset is the maximum possible for the particular number of balls 30. The maximum offset for the nine ball retainer 12 shown in FIG. 2 is 160°. For retainers having an even number of balls, the maximum offset is 180°. For retainers having an odd number of balls, the maximum offset $\Delta$ can be determined by the following:

$$\Delta = 180° - 360°/(N \times 2)$$

wherein:
N = number of ball pockets in one split ring.
The maximum offset can vary from $\Delta$ by up to 15 degrees to allow for manufacturing tolerances.

Figure 4:
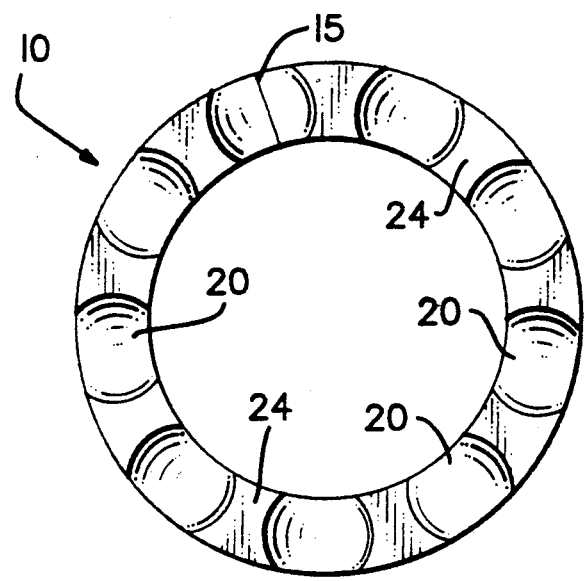
FIG. 4 is a plan view illustrating a second embodiment of an annular split ring of the split ring antifriction bearing retainer.
Figure 4A:
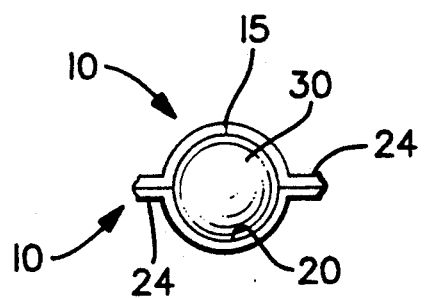
FIG. 4A is a side view of a portion of an assembled split ring antifriction bearing retainer showing the embodiment of FIG. 4.

FIGS. 1 and 2 show the free ends or split 15 being located in a bridge area 24 between adjacent ball pockets. A second embodiment of the retainer 12 is shown in FIGS. 4 and 4A. The ends 15 are located in a ball pocket 20 rather than in a bridge area 24. When the annular split rings 10 are welded one to the other, placing the ends 15 in a ball pocket 20 simplifies the welding. All the bridge areas 24 are identical, since none of the bridge areas 24 have a split or free ends 15 located in the bridge 24.

Figure 5:
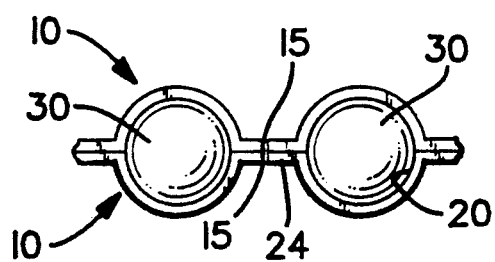
FIG. 5 is a side view of a portion of an assembled split ring antifriction bearing retainer showing another embodiment.

There are certain applications in which it is advantageous to have the split ends 15 of the annular split rings 10 coincident in the assembled split ring antifriction bearing retainer 12. FIG. 5 is a side view showing the coincident split ends 15. A small gap may be present between the split ends 15. The split ends 15 would produce, if coincident, a split retainer.

Such a split retainer would allow circumferential strain in the retainer as the balls of the bearing encounter various magnitudes and directions of loading caused by entering, being in, and leaving the load zone. Energy consumed in making the gap larger or smaller would reduce the energy available to cause the high forces known to exist between the balls and the retainers. A reduction of these forces would reduce the wear, improve the lubrication, and reduce the splitting forces which threaten the welds holding the two annular split rings 10 together.

A split ring antifriction bearing retainer 12 assembled with coincident split ends 15, as shown in FIG. 5, would produce a free situation in the circumference which normally sees various magnitudes and directions of stress. The degree to which the gap could open or close would reduce these cyclic stresses in certain applications, and could, in cases near the danger point, bring the stresses below the endurance limit, thus reducing the incidence of retainer fatigue failure.

The reduction in the typical force between the balls and the retainer would allow for improved lubrication. The higher these typical forces are, the more difficult it becomes to maintain an oil film at the very small area of contact. Whenever a gapped retainer experiences a change in the gap size, larger or smaller, these typical forces are reduced.

The gapped retainer may be described as one in which the continuity of the circumference is interrupted between two adjacent balls as shown in FIG. 5 or in the ball pocket 20 as shown in FIG. 4. This is accomplished by aligning the split ends 15 in the assembled split ring antifriction bearing retainer 12 as opposed to intentionally staggering the split ends 15 as described above for the first preferred embodiment.

Having described the invention, what is claimed is:

1. A ball bearing retainer comprising:
   two mating annular split rings, each split ring having a plurality of ball pockets, the ball pockets of one split ring being aligned with the ball pockets of the other split ring, the ends of one split ring being angularly offset from the ends of the other split ring, the ends of each split ring being located in a ball pocket of said split ring.

2. The ball bearing retainer of claim 1, wherein each split ring has an odd number of ball pockets, the angular offset $\Delta$ being determined by:

$$\Delta = 180° - 360°/(N \times 2) \pm 15°$$

wherein:
   N = number of ball pockets in one split ring.

3. A ball bearing retainer comprising:
   two mating annular split rings, each split ring having a plurality of ball pockets, the ends of each split ring being located in a ball pocket of said split ring, each split ring having an even number of ball pockets, the ball pockets of one split ring being aligned with the ball pockets of the other split ring, the ends of one split ring being angularly offset approximately 180 degrees from the ends of the other split ring.

4. A split antifriction bearing retainer comprising:
   two mating annular halves having corresponding angularly spaced matching ball pockets at their adjacent axial sides, the annular halves being split rings having ends, the ends of one annular half being angularly offset from the ends of the other annular half, the ends of each annular half being located in a ball pocket.

5. A split antifriction bearing retainer comprising:
   two mating annular halves having corresponding angularly spaced matching ball pockets at their adjacent axial sides, the annular halves being split rings having ends, the ends of one annular half being coincident with the ends of the other annular half, the annular halves being joined together within a plane to form a split ring.

6. The split antifriction bearing retainer of claim 5 wherein the ends of each annular half are located between adjacent ball pockets.

7. A split antifriction bearing retainer comprising:
   two mating annular halves having corresponding angularly spaced matching ball pockets at their adjacent axial sides, the annular halves being split rings having ends, the ends of one annular half being coincident with the ends of the other annular half, the ends of each annular half being located in a ball pocket.

* * * * *